Jan. 21, 1941.  L. McK. FIELD  2,229,063
TOP CYLINDER LUBRICANT-SOLVENT DISTRIBUTING MECHANISM
Filed Nov. 13, 1936
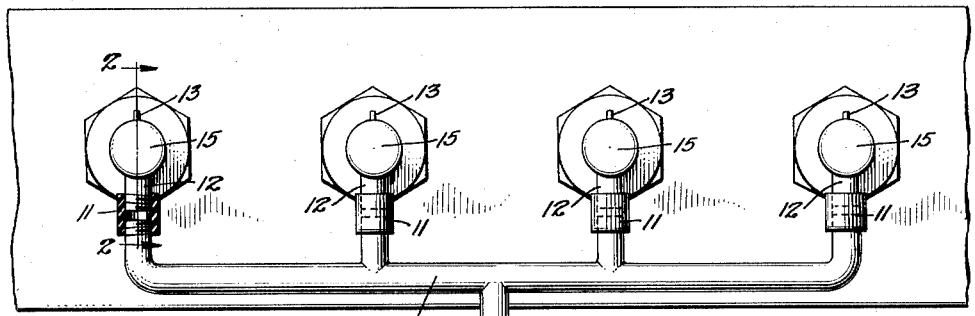
Fig. 1.
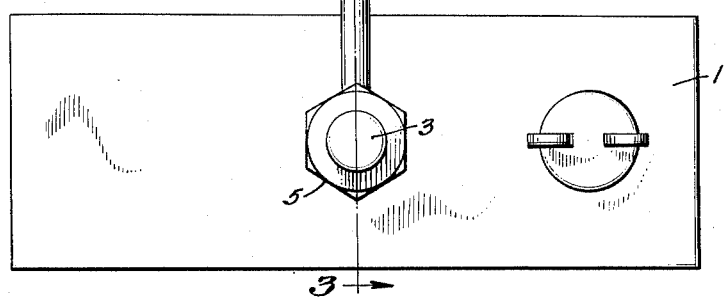
Fig. 2.  Fig. 3.
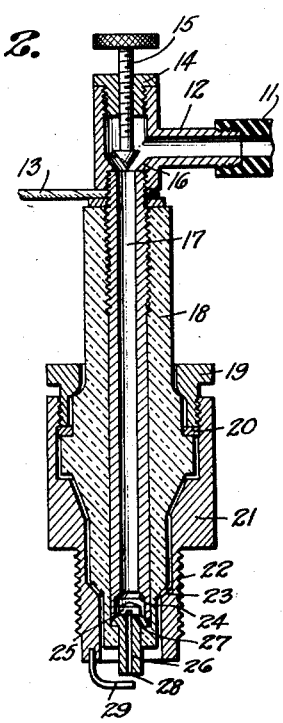
Inventor:
Lloyd McKinsey Field.

Patented Jan. 21, 1941

2,229,063

UNITED STATES PATENT OFFICE 2,229,063

TOP CYLINDER LUBRICANT-SOLVENT DISTRIBUTING MECHANISM

Lloyd McKinsey Field, Cleveland, Ohio

Application November 13, 1936, Serial No. 110,730

13 Claims. (Cl. 123—196)

This invention relates to the lubrication of the friction elements in the combustion chambers of internal combustion engines.

The primary object of the invention is to provide means for the lubrication of the friction elements in the combustion chambers of internal combustion engines by supplying a lubricant through openings in the walls of the combustion chambers, such as the usual spark plug receiving openings or ports.

A further object of the invention is to provide internal combustion engine lubricating means of the foregoing character wherein a lubricant is controlled in its supply to the combustion chambers of an internal combustion engine with the control means for each combustion chamber being independently operable if desired for the absolute control of the supply of lubricant.

In internal combustion engines, it has heretofore been the practice to introduce a lubricant into the combustion chambers by placing a certain quantity of such lubricant into the fuel tank or intake manifold, but in the practice of such methods, the lubricant is decomposed and transformed into combustible material, thereby losing its lubricating characteristics.

It is therefore a further and important object of this invention to introduce the lubricant into the combustion chamber of an internal combustion engine through the spark plug receiving opening or through a conduit-type spark plug mounted in said opening and at a time following the expulsion stroke or closing of the exhaust valve and preceding the entry of the fresh gas charge which in the inherent operation of internal combustion engines, is at substantially the period of maximum vacuum in the explosion chamber of the engine.

A still further object of the invention is to provide lubricating means for the friction elements in the combustion chamber of internal combustion engines wherein a supply of lubricant is in valved controlled communication with said combustion chambers through the spark plug receiving openings in said engine and controlled in its operation by movement of the pistons within the combustion chambers.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a fragmentary top plan view showing a lubricant tank in communication with the spark plugs of an internal combustion engine, Figure 2 is a vertical sectional view taken on line 2—2 of Figure 1, showing a part of the conduit connection between the conduit-type spark plug and lubricant tank, and Figure 3 is a vertical cross-sectional view taken on line 3—3 of Figure 1, showing the variable tensioned valve in the lubricant tank for controlling the flow of lubricant therefrom to the spark plugs.

Referring to the drawing:

As shown in Figures 1 and 3, reference character 1 designates an oil reservoir of suitable dimensions having a tubular leg 6 extending downwardly therein through the top wall of the reservoir, the lower open end of the tubular leg 6 terminating adjacent and in spaced relation to the bottom wall of the reservoir and being gradually reduced in diameter to provide a valve opening or seat 8 that is engaged by a ball valve 7 within the tubular leg. The open upper end of the tubular leg 6 is closed by a plug 5 that threads into said leg and said plug has a threaded axle bore therein in which a screw rod 3 is threaded and operated by a head carried by said screw rod upwardly of the plug 5. A collar 4 is rigid with the screw rod 3 beneath the plug 5 and the inner end of the screw rod projecting into the tubular leg 6 below the collar is surrounded by the upper end of a coil spring 2, which engages the collar 4 while the lower end of said spring 2 is engaged with the ball valve 7 for normally retaining the said valve on its seat 8. It will be understood that by adjusting the screw rod 3 through the closure plug 5 at the outer end of the tubular leg 6, the spring 2 may be variably tensioned in its engagement with the ball valve 7.

The lubricant in the reservoir 1 is adapted to be delivered in predetermined quantities into the combustion chamber of an internal combustion engine through spark plug receiving openings formed in the head of said engine and by means of valve controlled conduit-type spark plugs and conduits forming communication between the oil reservoir and said spark plugs.

In Figure 2 of the drawing there is illustrated a valve controlled conduit type spark plug including a tubular or conduit electrode 17 set into an insulator casing 18 provided with the usual shoulder that is located within the shell 21. The follower nut 19 threaded into the shell 21 moves the gasket 20 into binding engagement with the shoulder on the insulator casing or body 18. The lower end of the shell 21 is externally threaded as at 22 in the usual manner for mounting in a port or spark plug receiving opening in a wall of an internal combustion engine with the inner end of the spark plug being in communication with the combustion chamber of the engine. The lower end of the insulator or casing 18 is annularly reduced to provide a shoulder 23 engaged with the gasket seated on the corresponding internal shoulder formed on the inner wall of the lower threaded extension 22 of the shell.

The lower end of the conduit through the tubular electrode 17 is annularly enlarged to provide a chamber 25 defining an upper abutment or annular valve seat 24. The lower end of the insulator casing 18 has a tubular metal nipple 26 therein that is annularly enlarged at its upper end within said chamber 25 for contact with the lower end of the conduit electrode 17. The bore 28 through the nipple 26 is controlled in its communication with the passage through the conduit electrode 17 by means of a valve 27 mounted in said chamber 25 and of less diameter than said chamber, said valve being preferably of inverted cup shape with a convexed top wall that is adapted for seating engagement with the annular valve seat 24. As illustrated, the side walls of the inverted cup shaped valve 27 are notched so that when the valve is spaced from its seat 24 and resting upon the enlarged upper end of the nipple 26 communication is established between the bore 28 in the nipple and the passage through the conduit electrode 17 by way of said side wall notches and chamber 25 so that oil may flow through the conduit electrode 17, chamber 25 and nipple 26 to the combustion chamber of the engine. A negative electrode 29 for cooperation with the electrode nipple 26 is carried by the lower threaded end of the shell 21 and the spark gap between the electrode nipple 26 and the negative electrode 29 is in a zone below the lower threaded end 22 of the shell.

The upper end of the conduit electrode 17 projects above the insulator casing 18 and to which the electric ignition wire terminal 13 is connected, the same being maintained in engagement with the electrode 17 by means of a tubular cap 12 that is threaded onto the upper end of said electrode. A plug 14 is mounted in the upper end of the tubular cap 12 and has an internally threaded axial bore therethrough for the passage of a manually operated threaded valve stem 15 that carries a conical valve at its lower end for engagement with the tapering valve seat 16 formed in said cap 12, to control the quantity of lubricant passed through the conduit electrode for delivery to the combustion chamber.

Each tubular cap 12 carries a laterally extending tubular stem that is placed in engagement with branch pipes extending from a manifold 10 by means of insulated collars 11 and a pipe or conduit 9 forms communication between the manifold 10 and a tubular boss projecting laterally from the upper end of the tubular leg 6 above the lubricant reservoir 1.

The intake flow will be checked at the lower end of the conduit 17 at valve seat 24 on the upstroke of the piston by the force of compression exerted up-ward against the lower face of the check-valve 27 forcing it to seat its upper-faced rim into engagement with the valve seat 24 provided in the chambered section 25. On the down or suction stroke of the engine piston, compression being released and suction being applied, the valve 27 is drawn down to the upper face of lower electrode-conduit 26, and since the lower face of valve 27 and the upper face of lower electrode-conduit 26 are designed to prevent a true seating between these surfaces, the intake flow through the conduits from the reservoir 1 will pass into and through electrode-conduit 26 and into the combustion chamber open end at 28.

Although a preferred embodiment of my invention has been used in my description, it will be understood that slight changes may be made in material and structure and arrangement of parts, within the scope of my claims.

What is claimed is:

1. Means for supplying a lubricant to the combustion chamber of an internal combustion engine including a conduit-type valve controlled spark plug, a lubricant reservoir, means forming communication between the reservoir and the spark plug and means for regulating the quantity of lubricant delivered into the combustion chamber.

2. Means for supplying a lubricant to the combustion chamber of an internal combustion engine wherein a substantially complete vacuum is present between a lubricant reservoir and the combustion chamber of an engine, including a valve controlled conduit type spark plug, a lubricant reservoir, means forming communication between the reservoir and the spark plug, means associated with the reservoir for controlling the quantity of lubricant delivered therefrom and means associated with the spark plug for controlling the quantity of lubricant fed therethrough.

3. Means for supplying a lubricant to the combustion chamber of an internal combustion engine, comprising in combination with an engine having spark plug receiving openings through which the lubricant is delivered to the combustion chamber, conduit-type valved spark plugs mounted in said openings, a lubricant reservoir, means forming communication between the spark plug and reservoir and means associated with the reservoir for regulating and shutting off the feeding of lubricant therefrom.

4. Means for supplying a lubricant to the combustion chamber of an internal combustion engine including a conduit-type-valved spark plug, a lubricant reservoir, means forming communication between the reservoir and the spark plug and means associated with the reservoir for controlling the quantity of lubricant therefrom including a variably tensioned valve.

5. Means for supplying a lubricant to the combustion chamber of an internal combustion engine, comprising in combination with an engine having spark plug receiving openings through which the lubricant is delivered to the combustion chamber, conduit-type valved spark plugs mounted in said openings, a lubricant reservoir, means forming communication between the spark plugs and reservoir, means associated with the reservoir for regulating and shutting off the feeding of lubricant therefrom and means associated with each spark plug for regulating and shutting off the flow of lubricant therethrough.

6. Means for feeding lubricant to the combustion chamber of an internal combustion engine, wherein a spark plug is mounted in the engine and has a conduit extending longitudinally therethrough with a valve at the inner end of the conduit operable to open the conduit to the combustion chamber upon an induction stroke of a piston in the engine and to close the conduit upon a compression stroke of the piston, a lubricant reservoir, means forming communication between the conduit of the spark plug and the reservoir and separate means independently operable to control the feeding of lubricant from the reservoir and to control the flow of lubricant through the spark plug conduit to the combustion chamber.

7. Means for supplying lubricant in the optimum state for lubrication into the combustion chamber of an internal combustion engine, and wherein said means is solely controlled in its operation by piston activities within the engine, said means comprising an element having a conduit therethrough adapted to be mounted in a spark plug receiving opening in the engine with the conduit communicating with the combustion chamber of the engine, a valve carried by said element at the inner end of the conduit and solely actuated by piston activities within the engine, means for supplying lubricant to said element comprising an oil reservoir having a conduit connection with the outer end of the conduit of the said element and means at the outer end of the conduit of said element for regulating the volume of lubricant passing therethrough to the combustion chamber of the engine.

8. Means for supplying lubricant in the optimum state for lubrication through spark plug receiving openings into the combustion chamber of an internal combustion engine while the engine is in operation, comprising in combination, means mounted in said spark plug receiving openings, an oil reservoir, means forming communication between the oil reservoir and the means mounted in said spark plug openings, means for regulating the delivery of oil from said reservoir and means for regulating the flow of oil through the means mounted in the spark plug receiving openings.

9. Means for supplying regulated injections of lubricating oil in the optimum state for lubrication, separate and apart from fuel intake means, through spark plug-receiving openings to the combustion chamber of an internal combustion engine, comprising in combination, an internal combustion engine, an element having a conduit therethrough mounted in each spark plug-receiving opening of the combustion chamber of the engine and communicating with the combustion chamber, an oil reservoir, means forming communication between the oil reservoir and said element and impeding means for regulating the passage of oil from said reservoir and through the communication means into the combustion chamber.

10. Means for supplying regulated injections of lubricating oil in the optimum state for lubrication, separate and apart from fuel intake means, through spark plug-receiving openings to the combustion chamber of an internal combustion engine, comprising in combination, an internal combustion engine, an element having a conduit therethrough mounted in each spark plug-receiving opening of the combustion chamber of the engine and communicating with the combustion chamber, an oil reservoir, means closed to atmosphere forming communication between the oil reservoir and said element and impeding means for regulating the passage of oil from said reservoir and through the communication means into the combustion chamber.

11. Means for supplying lubricant in the optimum state for lubrication through spark plug-receiving openings and into the combustion chamber of an internal combustion engine and wherein said means is solely controlled in its operation by piston activities within the engine, said means comprising an element having a conduit therethrough adapted to be mounted in each spark plug-receiving opening of the combustion chamber of the engine with the conduit communicating with the combustion chamber of the engine, a valve carried by said element and solely actuated by piston activities within the engine, means for supplying lubricant to said element comprising an oil reservoir having a conduit connection with the conduit of said element and means associated with the conduit of said element for regulating the volume of lubricant passing therethrough to the combustion chamber of the engine.

12. Means for supplying regulated injections of lubricating oil in the optimum state for lubrication, separate and apart from fuel intake means, through the spark plug-receiving openings of the combustion chamber of an internal combustion engine, comprising in combination, an internal combustion engine, an element having a conduit therethrough mounted in each spark plug-receiving opening of the combustion chamber of the engine and communicating with the combustion chamber, an oil reservoir, means forming communication between the oil reservoir and said element and impeding means for regulating the passage of oil from said reservoir and the volume of each injection of oil through the communication means into the combustion chamber.

13. In an internal combustion engine of carbureted fuel type, wherein the engine includes spark plug-receiving ports, valve controlled means to inject lubricant onto moving parts within the combustion chamber, said means having a conduit therethrough communicating with said combustion chamber through said spark plug-receiving ports, a lubricant reservoir, and actuated valve controlled means for controlling the quantity of lubricant delivered from the reservoir and through said conduit to the combustion chamber.

LLOYD McKINSEY FIELD.